United States Patent Office 2,973,358
Patented Feb. 28, 1961

2,973,358
4,5,6,7-TETRACHLORO-3-IMINO-ISOINDOLINE-1-ONE DERIVATIVES
André Pugin, Basel, Switzerland, assignor to J. R. Geigy A.-G., Basel, Switzerland
No Drawing. Filed Dec. 24, 1957, Ser. No. 704,907
Claims priority, application Switzerland July 13, 1956
13 Claims. (Cl. 260—240)

The invention concerns new coloured condensation products which are distinguished by their colour strength, their stability to heat, their fastness to light and the fastness to migration of the coloured plastics obtained therewith. The invention also concerns a production process which, by using new starting materials enables the coloured condensation products to be produced in greater purity and better yields than could have been attained by using the hitherto usual methods. The invention concerns, in addition, processes for the dyeing of organic material such as paper and other types of cellulose, in particular however, processes for pigmenting plastics and lacquers by the use of the new condensation products as well as the material dyed with the aid of these products.

It is known that by condensing 3-imino-isoindoline-1-one, 3-thio-isoindoline-1-one or 3-imino-isoindoline-1-thione and derivatives thereof substituted at the benzo radical with aromatic amines and hydrazines which, apart from the amino group or the hydrazino group, contain also a further amino or hydrazino group, a substituted amino or hydrazino group or another ring bound either direct or fused, coloured condensation products are obtained which are suitable for the dyeing of cellulosic material such as paper, for the dyeing of lacquers as well as for pigmenting plastics. In the known process, the substituent in the 3-position is split off in the form of ammonia or hydrogen sulphide on heating the components alone or in inert organic solvents or diluents such as glacial acetic acid or alcohols and a C=N— double linkage is formed between the amino nitrogen atom and the carbon atom in the 3-position of the isoindoline-1-one ring. The coloured condensation products thus may be called azomethine dyes of the isoindoline-1-one series. However, condensation products which contain more than two substituents in the benzo radical of the isoindoline-1-one ring have not been known according to this process.

According to the present invention, however, it has now been found that condensation products obtained from diprimary amino compounds and isoindoline-1-ones which contain four halogen substituents in the benzo radical, are distinguished in the pure state from similar known compounds by particularly favourable fastness properties. For example, their colour is stronger, they are more fast to migration in plastics and, in particular, more fast to light. They are obtained by condensing one mol of a diprimary amino compound with an amount equivalent to the primary amino groups thereof of isoindoline-1-ones tetrahalogenated in the benzo radical, which isoindoline-1-ones contain substituents in the 3-position which can be easily exchanged and which, according to type or number, occupy two linkages of the 3-positioned C-atom and are more mobile than doubly bound oxygen.

The new coloured condensation products correspond to the forumla:

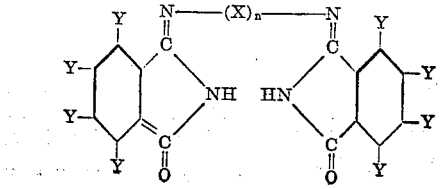

wherein
X represents the radical of an aromatic diamine,
Y represents halogen and
n represents the number 0 or 1.

The isoindoline-1-one derivatives used according to the present invention contain, according to the definition, four halogen substituents in the benzene ring. Of technical importance are particularly the tetrachloro compounds. Examples of the easily mobile substituents in the 3-position of the isoindoline-1-one compounds used according to the present invention are the imino group =NH; organically substituted imino groups =N—R, wherein R represents an alkyl, aralkyl, cycloalkyl or an iso or heterocyclic aryl radical for example the methyl, ethyl, butyl, hydroxyethyl, benzyl, cyclohexyl, phenyl, methylphenyl, chlorophenyl or 2-pyridyl group; two halogen substituents or two tertiary amino groups. These isoindoline-1-one derivatives more highly halogen substituted in the benzo radical are new.

Condensable 3-imino-isoindoline-1-one compounds according to a known process may be obtained from phthalic acid anhydrides on heating in nitrobenzene with urea and ammonium molybdate. However, it was found that the purity and yield of tetrahalogeno-3-imino-isoindoline-1-ones so produced leaves much to be desired. The greatest drawback however, arises from the fact that the impurities may not easily be removed from the desired product and unfavourably affect the purity and the fastness properties of the azomethine dyes produced therewith. Condensable tetrahalogeno-isoindoline-1-ones of high purity and easy accessability are thus prerequisites in the process of manufacture of the instant azomethine dyes. New methods for their manufacture are disclosed in copending application Serial No. 769,310, filed October 24, 1958, and in copending application Serial No. 769,311, also filed October 24, 1958, said applications having been divided out of the present application.

The following diprimary amino compounds can be used for example in the production of coloured condensation products according to the present invention: hydrazine and advantageously aromatic diprimary amino compounds of the iso- or heterocyclic series, e.g. 1.3- and 1.4-diaminobenzenes, 4.4'-diaminodiphenyl-and -triphenyl alkanes, 4.4'-diaminodiphenylamines, 4.4'-diamino-diphenyls, 4.4'-diaminoterphenyls, 4.4'-diaminostilbenes, 1.4-, 1.5-, 1.7- and 2.6-diaminonaphthalenes, 2.7-diaminofluorenes, 1.4- and 1.5-diamino anthraquinones, 2.6-diamino pyridines, 2.7-diamino-carbazoles, 2-(4'-aminophenyl) - 6-amino - benzthiazoles, 2.6-diamino-benzthiazoles, 2.5-bis-(4'-aminophenyl)-oxdiazoles and -thiadiazoles. Naturally, also isocyclic and heterocyclic aromatic diamines in which the amino groups are in other positions can be used. Advantageously, however, diamino compounds are used in which the amino groups are in the position of possible quinones. All aromatic rings can be still further substituted, e.g. by alkyl groups such as methyl, ethyl, tert. butyl, tert. amyl groups, by ether groups such as methoxy, ethoxy, butoxy, phenoxy, methyl-mercapto, ethylmercapto, phenylmercapto groups, by halogen atoms, by sulphonic acid and carboxylic acid groups, their salts, esters and amides, by nitro, acylamino, secondary and tertiary amino groups. Particularly favourable for the colour strength of the condensation products according to the present invention is the choice of such diprimary amino compounds which, on joining the isoindoline-1-one rings, produce a system of conjugated double linkages. Examples of such diamino compounds are hydrazine, 1.4-diaminobenzene, 1.4'-diaminodiphenyl and 4.4'-diaminostilbene compounds as well as diamino compounds of more highly condensed isocyclic or heterocyclic structures in which the amino groups take the positions of possible quinones. The list given above contains some examples of such diamino compounds. Of technical interest are the 1.3- and 1.4-diaminobenzene, 4.4'-diaminodiphenyl, 4.4'-diaminostilbene derivatives and the diaminonaphthylene derivatives corresponding to quinones, also the derivatives of 4.4'-diaminodiphenyl compounds which, by ring-forming linking members, are further condensed to form fluorenes, diphenylenoxides, diphenylene sulphides, diphenylene sulphones, carbazoles. The fact that they can be further substituted in the aromatic rings is common to all these compounds.

As is apparent from the preceding description, the preferred objects of the present invention are compounds of the above general formula, wherein Y is chloro and X stands for a 1.3- or 1.4-phenylene, a 1.4-, 1.5-, 1.7- or 2.6-naphthylene, a 4.4'-diphenylene and a 4.4'-stilbylene radical.

The condensation of the aforesaid diprimary amino compounds with the reactive tetrahalogeno-isoindoline-1-ones substituted in the 3-position by either two halogen atoms, preferably an imino or substituted imino group, possibly also by either sulphur or two tertiary amino groups, proceeds very quickly and easily often even in the cold, possibly on warming the well mixed components, particularly advantageously in the presence of inert organic solvents and diluents such as hydrocarbons, halogenated hydrocarbons, aliphatic or alicyclic ethers and ketones or esters. For example, cyclohexane, benzene, toluene, xylenes, tetraline, naphthalene, diphenyl, carbon tetrachloride, tetrachloroethylene, chlorobenzene, di- and tri-chlorobenzene, nitrobenzene, dibutyl ether, dioxan, diphenyl ether, acetone, cyclohexanone can be used as inert solvents. It is possible to perform the condensation in the presence of acid binding agents such as sodium acetate, magnesium oxide or calcium carbonate. Also organic nitrogen bases may possibly be used, e.g. pyridine, quinoline or dialkyl anilines.

Insofar as they are compounds having no acid, salt-forming groups, the coloured condensation products according to the present invention are very difficultly soluble substances. They precipitate from the solution of the components already while hot and can easily be purified by filtering off and washing with organic solvents, water, aqueous alkalies and aqueous acids. If starting materials are used which contain acid salt-forming groups, e.g. sulphonic acid or carboxyl groups, the condensation is performed advantageously in organic/aqueous solution. Yellow, orange, red, brown, violet to black condensation products are obtained according to the diamine used. Insofar as they are insoluble in water, due to their excellent fastness to light, their colour strength and fastness to migration in plastics, such as polyvinyl chloride, they are valuable pigment dyestuffs which are excellently suited for pigmenting lacquers, polymeric synthetic materials and rubber. In finely dispersed form, they can also be used for the dyeing of paper or for the dyeing of viscose or cellulose esters or polyamides in the spinning mass. If they contain water solubilising, salt-forming groups, they can be converted into insoluble dye lacquers with the earth alkali, earth or heavy metal salts usual for this purpose or, depending on the affinity, they can be used for the dyeing of cellulosic material such as paper, cellulose fibres or animal fibres.

Because of the mild reaction conditions prevailing in some of the processes of manufacture of condensable 4.5.6.7-tetrahalogenoisoindoline-1-ones as described, it is possible to perform the intermediate and azomethine dye production in a one batch process, as hereinafter described e.g. in Example 7. For example 1.3.3.4.5.6.7-heptachloro-isoindolenine can be reacted in an inert organic solvent such as chlorobenzene with one molecular proportion of an alcohol such as ethanol at room temperature. Then a polyprimary amino compound can be added advantageously mixed with a tertiary amine such as pyridine or triethylamine. If the reaction mixture is then boiled the desired azomethine dye of the isoindoline-1-one series separates immediately. Also the 3.4.5.6-tetrachloro-2-cyanobenzene-1-carboxylic acid lower alkyl or benzyl esters may be treated in inert organic solvents with dry ammonia at room temperature to form the condensable 3-imino-4.5.6.7-tetrachloro-isoindoline-1-ones and then the diprimary aromatic amines such as 4.4'-diaminodiphenyl compounds may be added. On boiling the reaction mixture the desired azomethine dyes separate and can be isolated by hot filtration and washing with organic solvents, aqueous acids, aqueous alkalies and pure water.

The following examples illustrate the invention which is a continuation-in-part of my copending application Ser. No. 669,928, filed July 5, 1957 (and which has been abandoned since the filing of the present application). Where not otherwise stated, parts are given as parts by weight. The temperatures are in degrees centigrade.

Example 1

A solution of 5.4 parts of 1.4-diaminobenzene in 200 parts of o-dichlorobenzene is added to a solution of 34 parts of 3.3.4.5.6.7-hexachloro-isoindoline-1-one in 300 parts of o-dichlorobenzene. The yellow suspension which immediately forms is then heated for 3 hours at 160–170° whereupon it is filtered hot and the residue is washed with o-dichlorobenzene, alcohol and acetone. 32 parts of a pure, strongly coloured, orange-yellow pigment are obtained which is distinguished by excellent fastness to light, migration and solvents.

The 3.3.4.5.6.7-hexachloro-isoindoline-1-one is produced by heating 1 mol of tetrachlorophthalimide with 1.2 mol of phosphorus pentachloride in chlorobenzene for 1 hour at 125°. First the unchanged tetrachlorophthalimide is filtered off hot whereupon, on cooling, the new hexachloro-indoline-1-one crystallises out. After recrystallising from benzene, it melts at 205–206° on decomposition. Calculated for $C_8HONCl_6$, N, 4.11. Found: N, 4.27.

Yellow pigments having similar good properties are obtained if in this example, the 1.4-diaminobenzene is replaced by 7.4 parts of 1.4-diaminonaphthalene or by 10.6 parts of 4.4'-diaminoazobenzene.

An even more red pigment having the same good properties is obtained if in this example the 1.4-diaminobenzene is replaced by 12.15 parts of 3.3'-dichlorobenzidine. More greenish pigments having very good fastness properties are also obtained if in this example, the 1.4-diaminobenzene is replaced by 5.4 parts of 1.3-diaminobenzene, 6.1 parts of 1-methyl-2.6-diaminobenzene, 12.3 parts of 2.7-diamino-dibenzothiophene-1.1-dioxide or 11.5 parts of 4.4'-diamino-3-nitrodiphenyl.

Example 2

A cold solution of 1.84 parts of 4.4'-diaminodiphenyl in 200 parts of benzene is added to a solution of 6.8 parts of 3.3.4.5.6.7-hexachloro-isoindoline-1-one in 200 parts of benzene. An orange precipitate forms immediately. The whole is stirred for 1 hour at room temperature, the pigment is filtered off and washed with benzene, acetone and water. The pure orange pigment can be recrystallised from a great deal of nitrobenzene and melts at over 360°. It has excellent fastness to light as well as very good fastness to migration, solvents, cross-lacquering, oil, acid and alkali.

Example 3

6.6 parts of 3.3'-dichloro-4.4'-diaminodiphenyl chlorohydrate are heated for half an hour at 200° with 11.6 parts of 3-imino-4.5.6.7-tetrachloro-isoindoline-1-one in 200 parts of nitrobenzene. The yellow-brown pigment formed is filtered off hot from the nitrobenzene, washed with alcohol, water and acetone. It has good fastness to migration and light. The 3-imino-4.5.6.7-tetrachloro-isoindoline-1-one is produced by heating 1 mol of tetrachlorophthalic acid anhydride and 4 mol of urea in the presence of $\frac{1}{100}$ mol of ammonium molybdate in nitrobenzene at 140°. The not quite pure reaction product melts on decomposition around 305°; it provides a not quite pure pigment.

Example 4

A solution of 6.8 parts of 3.3.4.5.6.7-hexachloro-isoindoline-1-one in 100 parts of xylene is refluxed for 2 hours with a solution of 2.44 parts of 4.4'-diamino-3.3'-dimethoxydiphenyl in 100 parts of xylene. The pigment is filtered off and washed with alcohol. It is a yellowish-red pigment which has very good fastness properties. If this pigment is again heated for 1 hour at 200° in 100 parts of nitrobenzene, it becomes bluish red and its already very good fastness to light is more noticeably improved.

Example 5

A solution of 10.6 parts of 4.4'-diamino-3.3'-dimethyldiphenyl in 150 parts of o-dichlorobenzene and a solution of 35 parts of 3.3.4.5.6.7-hexachloro-isoindoline-1-one in 500 parts of o-dichlorobenzene are heated for 3 hours at 160-170° while stirring. The precipitate is filtered off hot, washed with alcohol and acetone and, after drying, 34 parts of a pure red pigment are obtained which has very good fastnes to oil, acid, alkali, solvents, migration and light.

Red pigments having the same good properties are also obtained if in this example, 7.4 parts of 1.5-diaminonaphthalene or 10.5 parts of 4.4'-diaminostilbene are used instead of 4.4'-diamino-3.3'-dimethyldiphenyl.

Example 6

14.2 parts of 3-imino-4.5.6.7-tetrachloro-isoindoline-1-one and 4.6 parts of 4.4'-diaminodiphenyl are refluxed for 2 hours in 300 parts of glacial acetic acid. A pure orange pigment is formed which is filtered off and purified by washing with glacial acetic acid, alcohol and acetone. The pigment is identical to that of Example 2.

The 3-iminio-4.5.6.7-tetrachloro-isoindoline-1-one used above is obtained by reacting 34 parts of 3.3.4.5.6.7-hexachloro-isoindoline-1-one with 60 parts of aqueous ammonia. It is a pale yellowish powder which melts at 320° on decomposition. The same pure orange pigment is obtained, if in this example, 18 parts of 3-phenylimino-4.5.6.7-tetrachloro-isoindoline-1-one (M.P. 264–265°) are reacted with 4.6 parts of 4.4'-diaminodiphenyl instead of 3 - imino - 4.5.6.7 - tetrachloro-isoindoline-1-one. 3-phenylimino-4.5.6.7-tetrachloro-isoindoline-1-one is obtained by reacting 34 parts of 3.3.4.5.6.7-hexachloro-isoindoline-1-one with 40 parts of aniline in benzene at 70°.

If in this example, the 3-imino-4.5.6.7-tetrochloro-isoindoline-1-one is replaced by 18 parts of 3-(2'-pyridyl-imino)-4.5.6.7-tetrachloro-isoindoline-1-one (M.P. 264–266°, produced from 3.3.4.5.6.7-hexachloro-isoindoline-1-one and 2-amino pyridine in o-dichlorobenzene), then the same orange pigment is obtained.

Example 7

6.6 parts of 1.3.3.4.5.6.7-heptachloro-isoindolenine are dissolved in 80 parts of dioxan and the solution is added to a solution of 2 parts of 4.4'-diaminodiphenyl chlorohydrate in 300 parts of water. The suspension is heated to 80°, the orange pigment is filtered off and washed with alcohol and acetone. It can be recrystallised from nitrobenzene and is then identical to the pigment produced according to Example 2.

Example 8

3.4 parts of 3.3.4.5.6.7-hexachloro-isoindoline-1-one and 1 part of hydrazine hydrate are heated to 100° for 5 minutes in 100 parts of chlorobenzene. The greenish-yellow pigment which precipitates is filtered off hot and washed with acetone and water. It is distinguished by its purity and its excellent fastness to migration and light.

Example 9

1.58 parts of pyridine are added to 6.8 parts of 3.3.4.5.6.7-hexachloro-isoindoline-1-one in 100 parts of dioxan. A white precipitate immediately forms. A solution of 1.84 parts of 4.4'-diaminodiphenyl in 50 parts of dioxan is added whereupon the suspension turns first yellow and then orange. After heating for 2 hours at 90–95°, the orange pigment is filtered off and washed with alcohol and water. It has excellent fastness to light.

Example 10

The solution of a mixture of 1.84 parts of 4.4'-diaminodiphenyl and 2.53 parts of 3.3'-dichlorobenzidine in 100 parts of o-dichlorobenzene is added to a solution of 13.2 parts of 3.3.4.5.6.7-hexachloro-isoindoline-1-one in 200 parts of o-dichlorobenzene. The orange suspension formed is heated for an hour at 170°, the precipitate is filtered off and washed with acetone. The pigment thus obtained is more yellow but has the same good fastness properties as that of Example 2.

Example 11

2.38 parts of 1.5-diamino anthraquinone are dissolved in 100 parts of hot nitrobenzene and condensed for 2 hours at 140° with 6.6 parts of 3.3.4.5.6.7-hexachloro-isoindoline-1-one dissolved in 100 parts of nitrobenzene. The pigment which has been filtered off is stirred again for 1 hour at 200° in 100 parts of nitrobenzene, filtered off hot and washed with alcohol and acetone. The pigment so obtained is blue-black and is distinguished by its good fastness properties and its colour strength.

Example 12

13 parts of 3.3.4.5.6.7-hexachloro-isoindoline-1-one are heated with 2.2 parts of 2.6-diaminopyridine in 200 parts of o-dichlorobenzene for 2 hours at 170°. The yellow pigment is filtered off hot and washed with alcohol. It has good fastness to acid, alkali, oil and light.

Example 13

142.5 parts of tetrachlorophthalimide and 110 parts of phosphorus pentachloride in 500 parts of chlorobenzene are heated for 1 hour at 125°. A solution of 48 parts of 4.4'-diaminodiphenyl in 300 parts of chlorobenzene is added and the whole is stirred for 2 hours at 125°. 300 parts of ethanol are added to the suspension, the pigment is filtered off, washed with alcohol, acetone, diluted ammonia solution and water and dried. This crude pigment is again purified by boiling out with nitrobenzene and filtering hot. The pigment is orange and has good fastness to migration and light.

Example 14

17.2 parts of 3.3.4.5.6.7-hexachloro-isoindoline-1-one are dissolved in 250 parts of benzene. This solution is mixed with a solution of 4.6 parts of 4.4'-diaminodiphenyl in 200 parts of benzene and 8 parts of pyridine and the whole is refluxed for 1 hour. A pure orange pigment is formed which is filtered off under suction and washed with alcohol and water.

Also 10.1 parts of triethylamine can be used in this example instead of pyridine.

Example 15

4.41 parts of 3.3-bis-morpholino-4.5.6.7-tetrachloro-isoindoline-1-one (M.P. 211–212°, produced by reacting 3.3.4.5.6.7-hexachloro-isoindoline-1-one with morpholine in benzene), are heated for 5 minutes at 100° with 0.92 part of 4.4'-diaminodiphenyl in 50 parts of glacial acetic acid. After filtering and washing the residue with glacial acetic acid and water, an orange pigment is isolated which has excellent fastness properties.

An orange pigment having similar good properties is obtained if in this example, the 3.3-bis-morpholino-4.5.6.7-tetrachloro-isoindoline-1-one is replaced by 5.25 parts of 3.3-bis-dibutylamino-4.5.6.7-tetrachloro-isoindoline-1-one. This latter compound is produced by reacting 3.3.4.5.6.7-hexachloro-isoindoline-1-one with di-n-butylamine in benzene.

Example 16

2.96 parts of 2.5-bis-(4'-aminophenyl)-oxadiazole and 6.8 parts of 3.3.4.5.6.7-hexachloro-isoindoline-1-one in 100 parts of o-dichlorobenzene are heated for 2 hours in a vacuum at 120° under 90 mm. Hg pressure. After filtering off and washing the residue with alcohol, acetone and water, a pure yellow pigment is obtained which has excellent fastness to light and migration.

If, instead of 2.5-bis-(4'-aminophenyl)-oxadiazole, 3.20 parts of 2.5-bis-(3'-methyl-4'-aminophenyl)-oxadiazole are used, then a more reddish pigment which has similar good properties is obtained.

Pigments having still more red shades are obtained if in this example the 2.5-bis-(4'-aminophenyl)-oxadiazole is replaced by 3.12 parts of 2.5-bis-(4'-aminophenyl)-thiadiazole or by 3.8 parts of 2.5-bis-(3'-chloro-4'-aminophenyl)-thiadiazole.

Example 17

10 parts of the pigment obtained according to Example 1 from 1.4-diaminobenzene, 10 parts of hydrate of alumina, 30 parts of linseed oil varnish of medium viscosity and 0.2 part of cobalt linoleate are mixed and rubbed in a three-roll mill. A graphic colour is obtained which produces reddish-yellow prints of particular purity and colour strength and, in addition, has excellent fastness to solvents, acid, alkali and light.

Example 18

10 parts of the pigment obtained according to Example 2, 10 parts of titanium dioxide, 35 parts of a 60% solution of a modified urea alkyd resin in xylene/butanol 1:1, 10 parts of turpentine oil and 5 parts of xylene are milled for 45 hours in a ball mill. After pouring onto aluminium sheets and annealing for one hour at 120°, a pure orange dyeing is obtained which has excellent fastness properties, in particular very good fastness to cross-lacquering.

Example 19

67 parts of polyvinyl chloride, 33 parts of dioctyl phthalate, 2 parts of dibutyl tin dilaurate, 1 part of the pigment obtained according to Example 4 and 2.5 parts of titanium dioxide are mixed for 15 minutes at 150° on a roller frame and worked up into a thin foil. The red dyeing so obtained is distinguished by its good colour strength and its excellent fastness to heat, migration and light.

What I claim is:

1. A compound of the general formula:

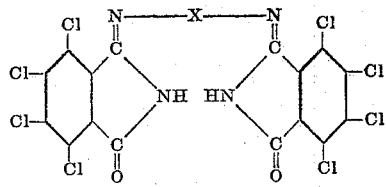

wherein =N—X—N= stands for di-iminoaryl of which the indicated nitrogen atoms are aromatically bound.

2. A compound which corresponds to the general formula:

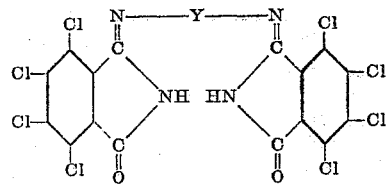

wherein =N—Y—N= represents di-iminophenyl.

3. A compound which corresponds to the general formula:

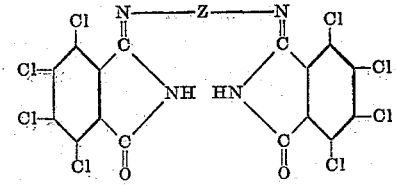

wherein =N—Z—N= represents di-iminonaphthyl.

4. A compound which corresponds to the general formula:

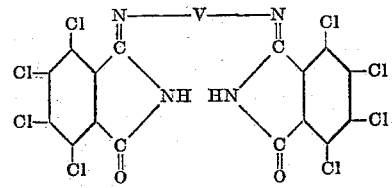

wherein =N—V—N= represents bis-p-iminophenyl.

5. A compound which corresponds to the general formula:

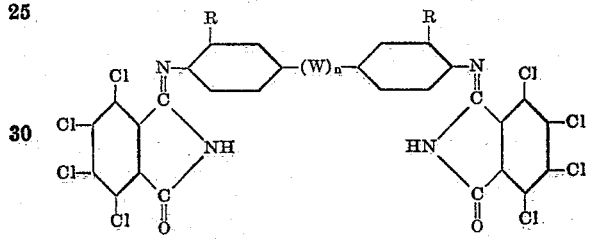

wherein
W represents a radical selected from the group consisting of —CH=CH—, —N=N—,

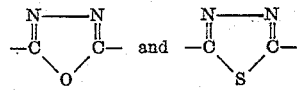

R represents a radical selected from the group consisting of H, Cl, CH$_3$ and OCH$_3$, and
$n$ is one of the numerals 0 and 1.

6. The compound of the formula:

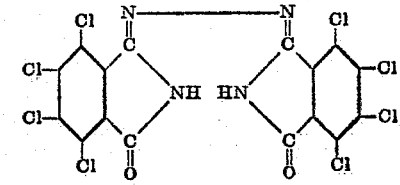

7. The compound of the formula:

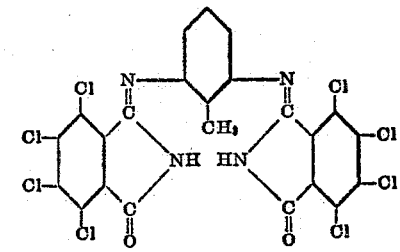

8. The compound of the formula:

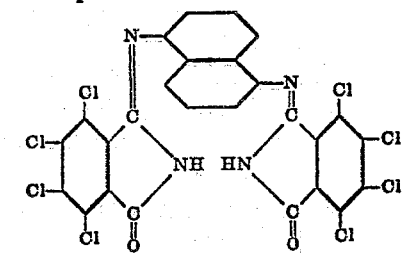

9. The compound of the formula:

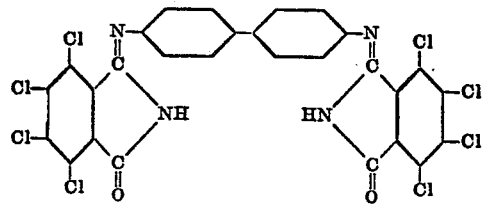

10. The compound of the formula:

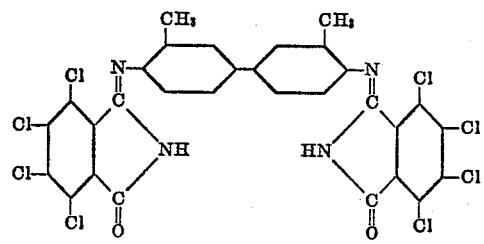

11. The compound of the formula:

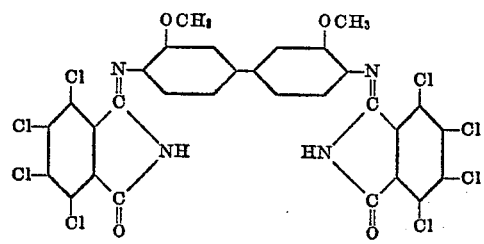

12. The compound of the formula:

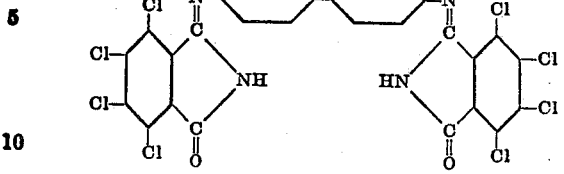

13. The compound of the formula:

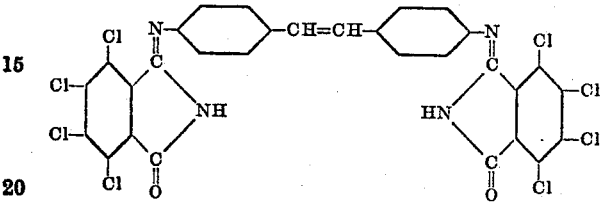

References Cited in the file of this patent
UNITED STATES PATENTS

| | | |
|---|---|---|
| 2,537,352 | Jones | Jan. 9, 1951 |
| 2,692,267 | Campbell | Oct. 19, 1954 |
| 2,701,252 | Vollman et al. | Feb. 1, 1955 |

FOREIGN PATENTS

| | | |
|---|---|---|
| 945,782 | Germany | July 19, 1956 |
| 615,697 | Great Britain | Jan. 10, 1949 |

OTHER REFERENCES

Ind. and Eng. Chem., vol. 39, No. 11, p. 1420 (1947).
Elvidge et al.: J. Chem. Society (1952), pp. 5000–5007.
Clark et al.: J. Chem. Society (1953), pp. 3593–3601.